(12) United States Patent
Notohamiprodjo et al.

(10) Patent No.: US 8,044,643 B1
(45) Date of Patent: *Oct. 25, 2011

(54) POWER SUPPLY SWITCHING CIRCUIT FOR A HALOGEN LAMP

(75) Inventors: Hubertus Notohamiprodjo, Union City, CA (US); Liang Chen, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 64 days.

This patent is subject to a terminal disclaimer.

(21) Appl. No.: 12/422,857

(22) Filed: Apr. 13, 2009

Related U.S. Application Data

(63) Continuation of application No. 11/076,726, filed on Mar. 9, 2005, now Pat. No. 7,525,293.

(60) Provisional application No. 60/633,901, filed on Dec. 6, 2004.

(51) Int. Cl.
G05F 1/10 (2006.01)

(52) U.S. Cl. ........... 323/235; 315/307; 315/219; 363/96

(58) Field of Classification Search .................. 315/291, 315/224, 209 R, 307, 244, 276, 219; 363/95, 363/97, 98, 74, 21.02, 21.03, 79; 323/235, 323/265, 282

See application file for complete search history.

(56) References Cited

U.S. PATENT DOCUMENTS

| | | | |
|---|---|---|---|
| 4,741,010 A * | 4/1988 | Hino et al. ..................... 378/105 |
| 4,949,016 A * | 8/1990 | De Bijl et al. .................. 315/208 |
| 4,952,849 A | 8/1990 | Fellows et al. |
| 5,089,751 A | 2/1992 | Wong et al. |
| 5,283,727 A | 2/1994 | Kheraluwala et al. |
| 5,371,440 A | 12/1994 | Liu et al. |
| 5,461,287 A | 10/1995 | Russell et al. |
| 5,515,257 A | 5/1996 | Ishii |
| 5,604,409 A | 2/1997 | Fisher |
| 5,615,093 A | 3/1997 | Nalbant |
| 5,757,630 A | 5/1998 | Lesea |
| 5,850,127 A | 12/1998 | Zhu et al. |
| 5,907,223 A | 5/1999 | Gu et al. |
| 6,094,017 A | 7/2000 | Adamson |
| 6,111,769 A | 8/2000 | Zhang et al. |
| 6,377,107 B1 | 4/2002 | Franck |
| 6,459,600 B2 | 10/2002 | Farrington et al. |
| 6,696,803 B2 | 2/2004 | Tao et al. |
| 6,784,622 B2 | 8/2004 | Newman et al. |
| 6,856,098 B2 | 2/2005 | Piaskowski |
| 6,876,157 B2 * | 4/2005 | Henry ............................ 315/219 |
| 6,940,733 B2 | 9/2005 | Schie et al. |
| 7,053,561 B2 | 5/2006 | Mayer et al. |
| 7,067,991 B2 | 6/2006 | Hsu et al. |
| 7,183,724 B2 * | 2/2007 | Ball .............................. 315/274 |
| 2002/0097006 A1 | 7/2002 | Chao |

(Continued)

OTHER PUBLICATIONS

Bhavaraju and Enjeti, "A Fast Active Power Filer to Correct Line Voltage Sags", IEEE Transactions on Industrial Electronics, 41(3):333-338, Jun. 1994.

(Continued)

*Primary Examiner* — Jacob Y Choi
*Assistant Examiner* — Ephrem Alemu

(57) ABSTRACT

A power supply and methods are provided. In one implementation, the power supply includes a switching circuit and a converter. The switching circuit includes a first transistor and a second transistor, and the converter includes a capacitor and an inductor. The switching circuit alternately switches an input voltage to the converter. The power supply further includes a controller operable to adjust a switching frequency of the first transistor and the second transistor to substantially match a resonant frequency of the capacitor and the inductor.

20 Claims, 9 Drawing Sheets

U.S. PATENT DOCUMENTS

| | | |
|---|---|---|
| 2002/0149890 A1 * | 10/2002 | Kaneko et al. .................. 361/18 |
| 2004/0012346 A1 | 1/2004 | Green et al. |
| 2004/0085792 A1 * | 5/2004 | Lin et al. ....................... 363/131 |
| 2004/0155602 A1 | 8/2004 | Buij et al. |
| 2006/0175983 A1 * | 8/2006 | Crouse et al. ................. 315/291 |
| 2007/0138971 A1 | 6/2007 | Chen |

OTHER PUBLICATIONS

Ellis, "Control System Design Guide," *Academic Press*, $2^{nd}$ Ed., 159-173 (2000).

\* cited by examiner

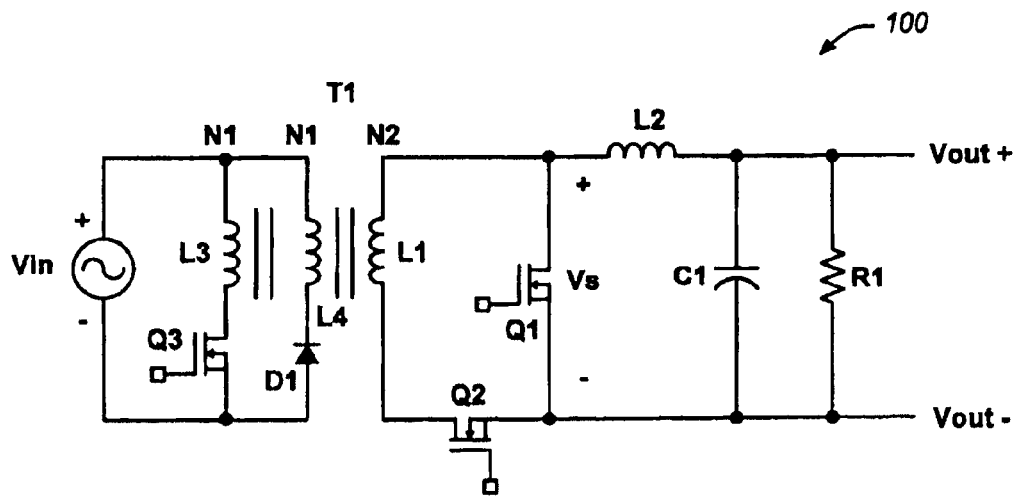
FIG._1 (PRIOR ART)
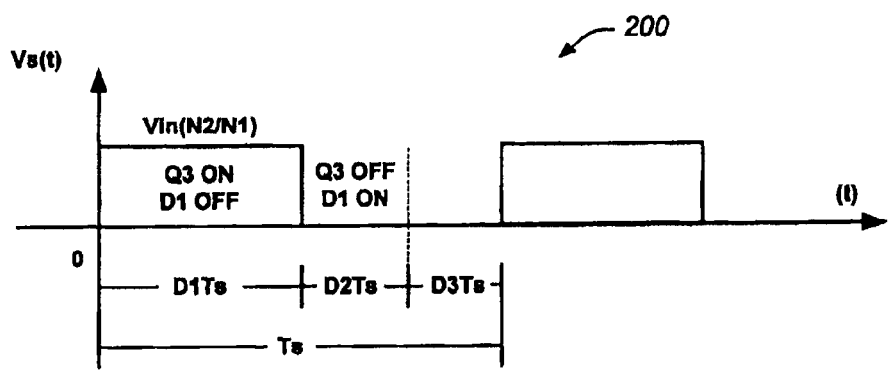
FIG._2 (PRIOR ART)

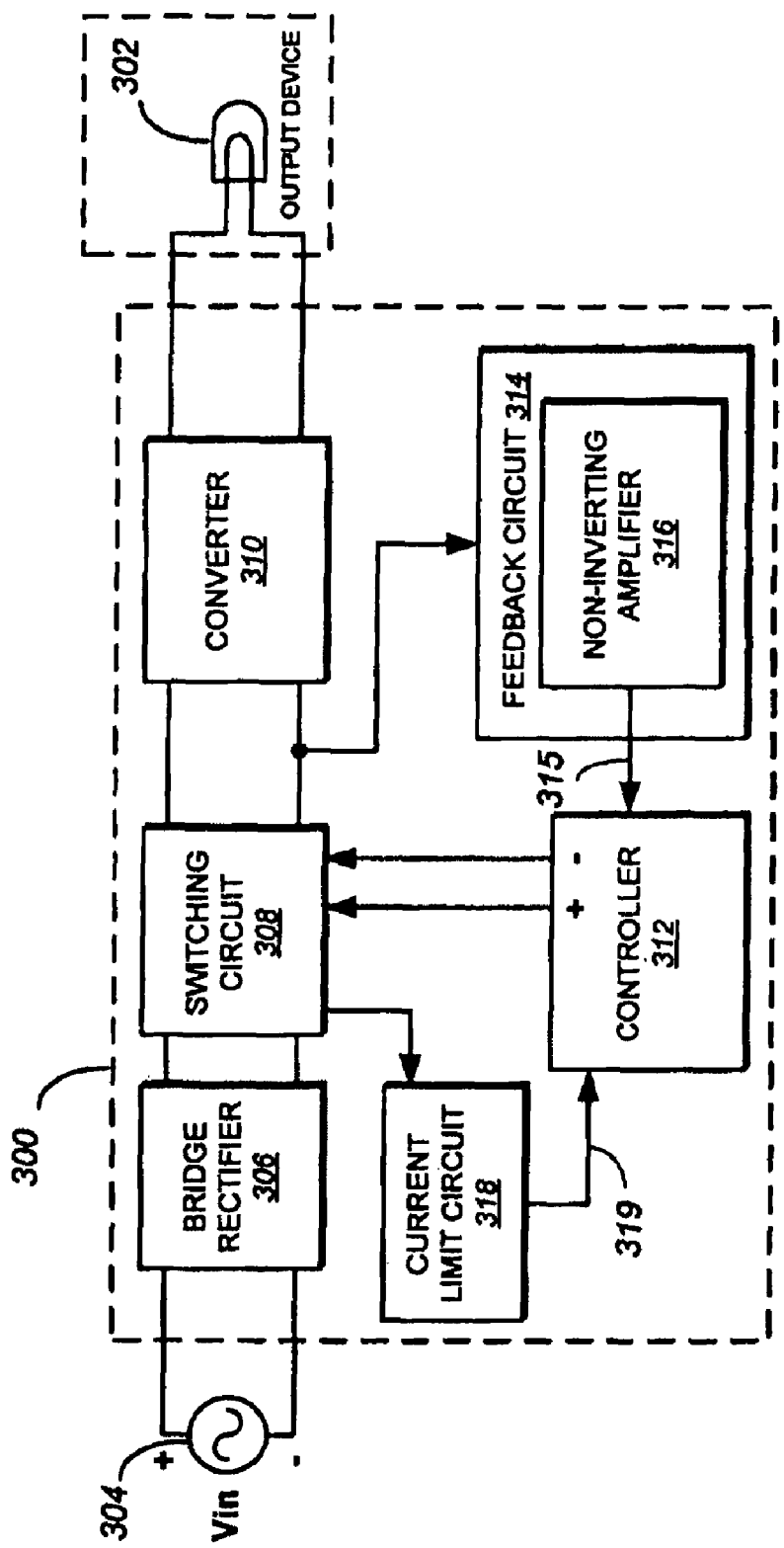
FIG._3

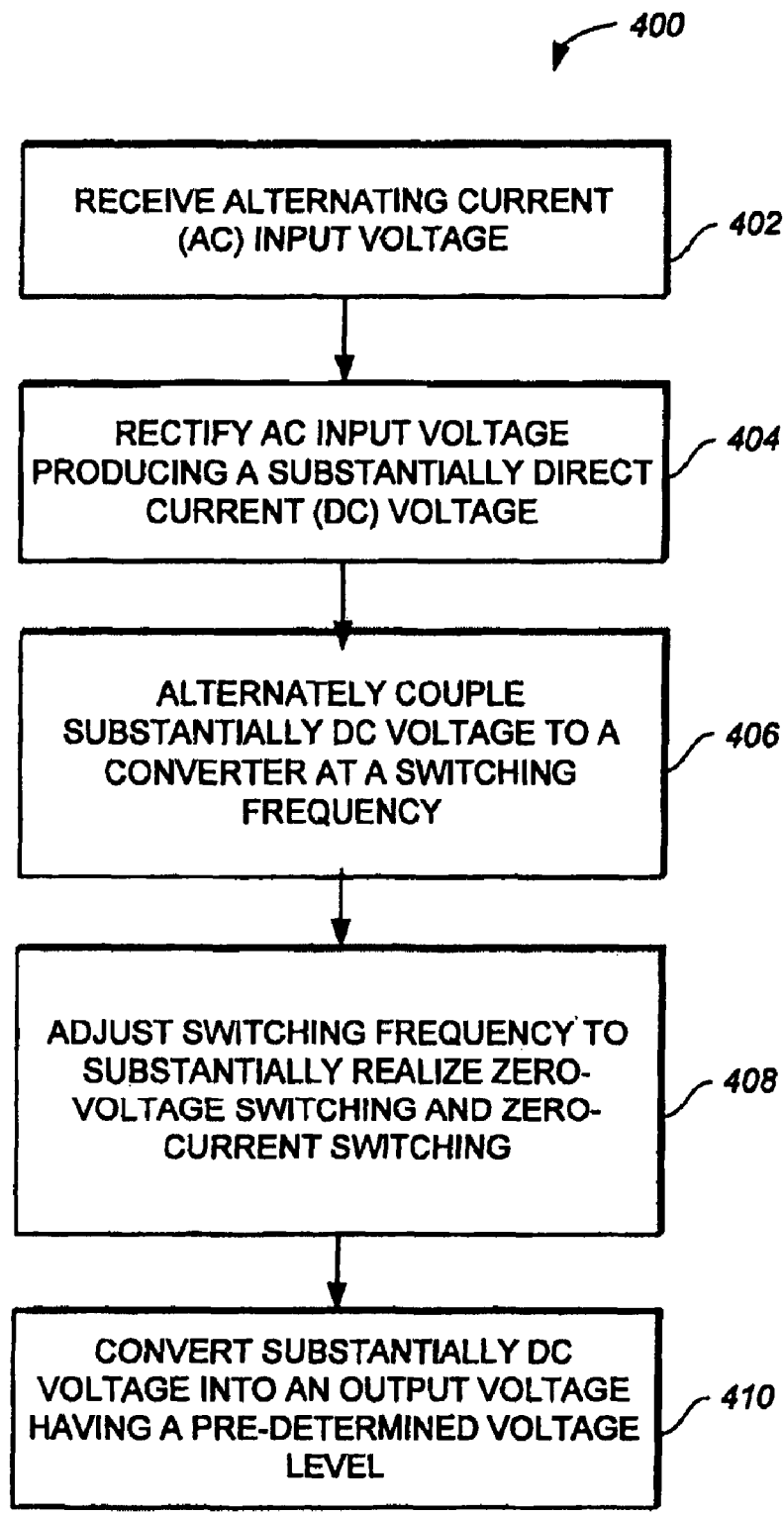
FIG._4

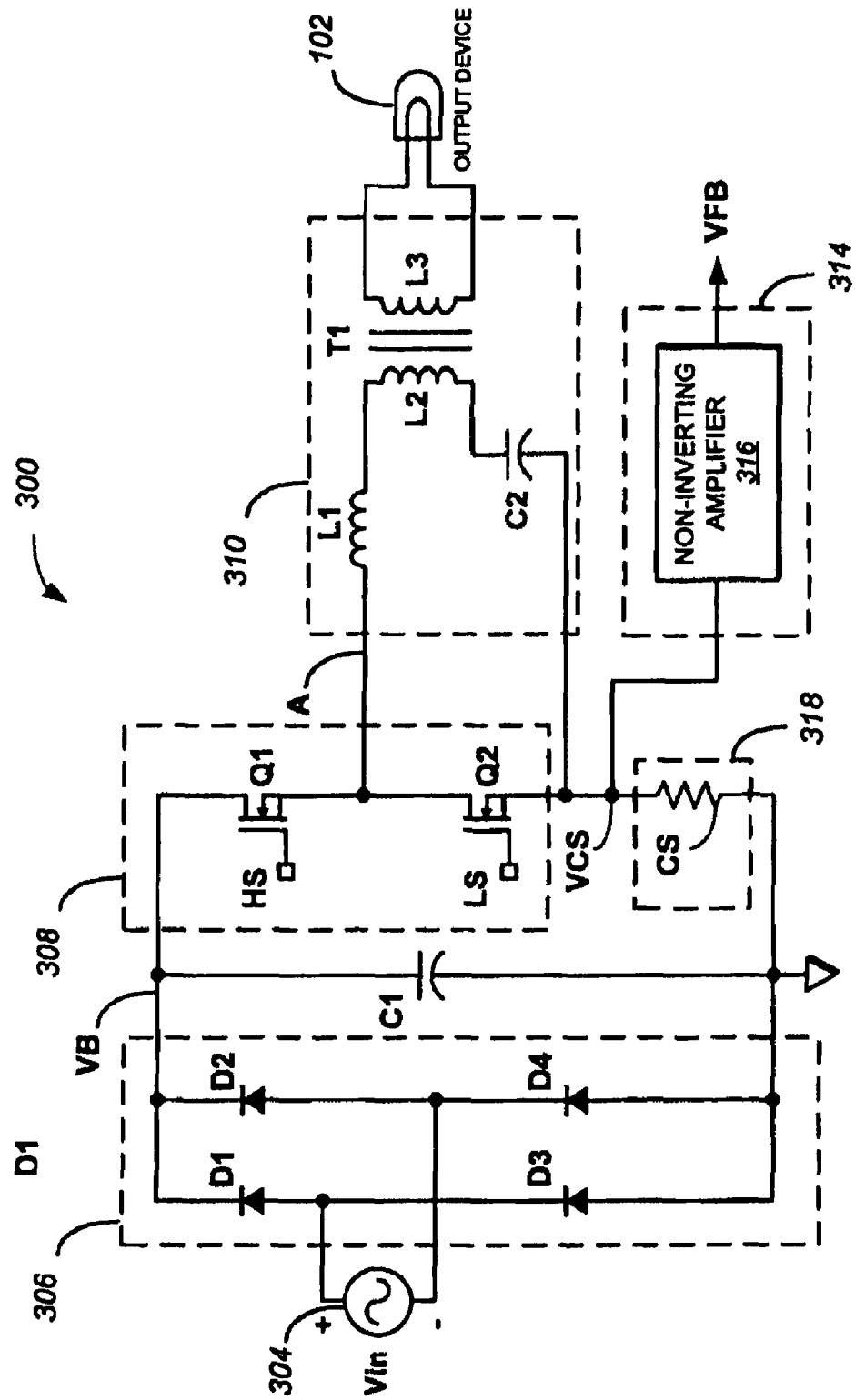
FIG._5

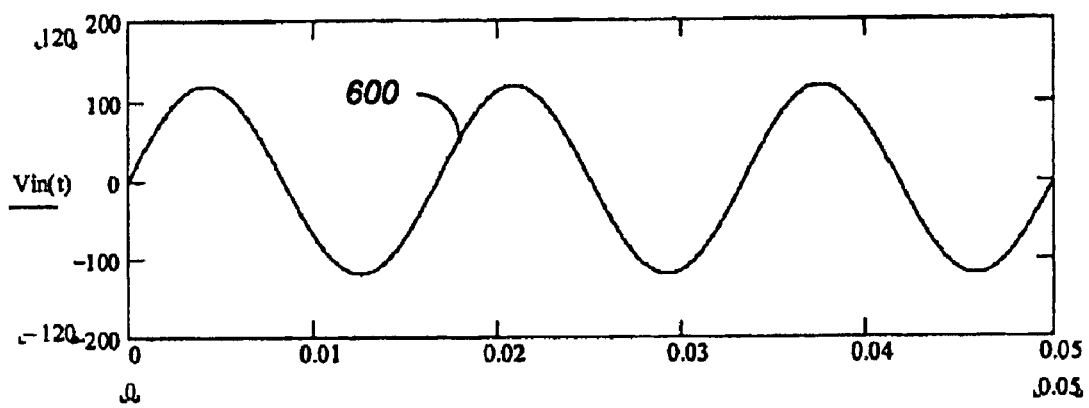
FIG._6
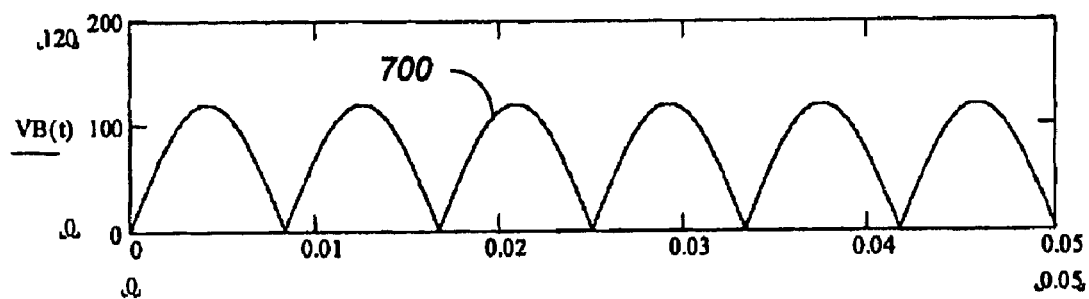
FIG._7
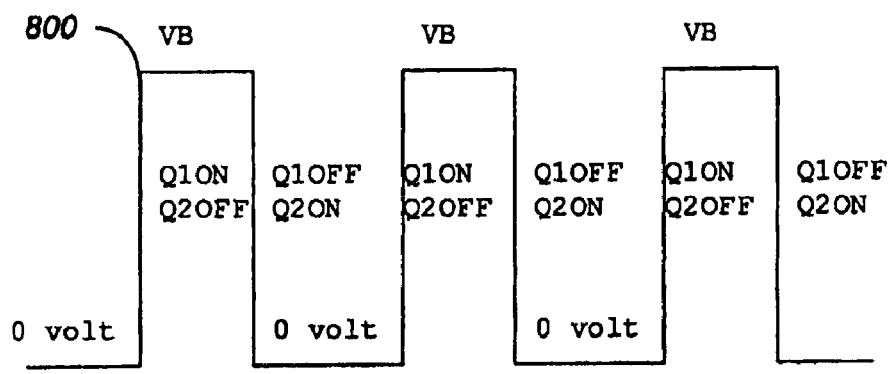
FIG._8

POWER SUPPLY SWITCHING CIRCUIT FOR A HALOGEN LAMP

CROSS-REFERENCE TO RELATED APPLICATIONS

This application is a continuation of, and claims priority to U.S. Ser. No. 11/076,726, filed Mar. 9, 2005, which claims the benefit of priority to U.S. Provisional Patent Application No. 60/633,901, filed on Dec. 6, 2004, and is related to U.S. patent application Ser. No. 11/019,925; the disclosures of each of these applications are incorporated herein by reference.

BACKGROUND

The following disclosure relates to electrical circuits and signal processing.

Power supplies are used to power many types of electronic devices, for example, halogen lamps. Conventional power supplies (e.g., for halogen lamps) typically include a converter. A converter is a power supply switching circuit.

FIG. 1 shows a conventional forward converter 100 including a synchronous rectifier that receives a DC (direct current) or a rectified AC (alternating current) voltage from a power source Vin. Forward converter 100 includes transistors Q1-Q3, inductors L1-L4, a capacitor C1, a clamping diode D1, and a resistor R1. Inductors L3, L4, L1 form a transformer T1. In particular, inductors L3, L4 form primary windings (having opposite polarities) of transformer T1, and inductor L1 forms a secondary winding of transformer T1. Inductor L2 and capacitor C1 form a lowpass LC filter. In operation, during a transformer set period—e.g., when (switching) transistor Q3 turns on—a voltage on the primary windings of transformer T1 is transferred to the secondary winding of transformer T1. During a transformer reset period—e.g., when transistor Q3 turns off—clamping diode D1 turns on to return the voltage set in the secondary winding of transformer T1 to the primary windings of transformer T1.

FIG. 2 illustrates a timing diagram 200 of a voltage Vs of forward converter 100 with respect to time. Voltage Vs represents an unfiltered output voltage of forward converter 100. Ts represents one period cycle for transistor Q3. D1Ts represents a time period during which transistors Q2 and Q3 are on, while transistor Q1 and clamping diode D1 are off. D2Ts represents a time period during which clamping diode D1 and transistor Q1 are on, while transistors Q2 and Q3 are off. D3Ts represents a time period during which clamping diode D1 is off and transistors Q1, Q2, and Q3 are off. The lowpass LC filter filters the high frequency components associated with voltage Vs, and only a DC component of voltage Vs forms an output voltage Vout. As shown in FIG. 2, voltage Vs is equal to (Vin)*(N2/N1) during time period D1Ts, and is equal to zero during time periods D2Ts and D3Ts. An average value for output voltage Vout is therefore given by the following equation:

$$Vout := \left(\frac{1}{Ts}\right) \cdot \left[Vin \cdot \left(\frac{N2}{N1}\right) \cdot D1 \cdot Ts + 0 \cdot D2 \cdot Ts + 0 \cdot D3 \cdot Ts\right] \quad \text{(eq. 1)}$$

$$Vout = (Vin) * (N2/N1) * (D1),$$

where N2 represents a number of turns of the secondary winding, N1 represents a number of turns of the primary clamp windings, Vin represents the source voltage, and D1 represents a fraction associated with the time period during which a switching transistor (e.g., transistor Q3) is on. As shown by equation (1), conventional forward converters typically transfer energy to a secondary winding of a transformer only during an on-time of a switching transistor (e.g., transistor Q3). Conventional forward converters, therefore, generally have a limited efficiency. Also, conventional power supplies typically experience a high switching loss in switching transistors (e.g., switching transistor Q3).

SUMMARY

In general, in one aspect, this specification describes a power supply that includes a bridge rectifier to rectify an alternating current (AC) voltage and generate an input voltage, and a switching circuit to alternately switch the input voltage to a converter. The switching circuit includes a first transistor and a second transistor. The power supply further includes a converter to convert the input voltage into an output voltage. The converter includes a capacitor and an inductor. The power supply further includes a controller operable to adjust a switching frequency of the first transistor and the second transistor to substantially match a resonant frequency of the capacitor and the inductor, a feedback circuit to generate a feedback dimming control signal to the controller for reducing the output voltage of the converter, and a current limit circuit to send a first error signal to the controller in an event that the power supply exceeds a pre-determined current limit. The controller is operable to shut down the converter responsive to the error signal.

Particular implementations can include one or more of the following features. The converter can be an isolated series resonant converter. The controller can adjust the switching frequency of the at least one of the first or second transistors in the switching circuit to substantially match a resonant frequency of the isolated series resonant converter. The controller can include a detector to detect a peak voltage associated with the feedback dimming control signal, an operational amplifier to compare the detected peak voltage with a reference voltage and generate a second error signal, and a frequency control circuit operable to adjust the switching frequency of the switching circuit using the second error signal. The controller can reduce the output voltage of the converter by adjusting a switching frequency of the switching circuit.

In general, in another aspect, the specification describes a power supply that includes a switching circuit and a converter. The switching circuit includes a first transistor and a second transistor, and the converter includes a capacitor and an inductor. The switching circuit alternately switches an input voltage to the converter. The power supply further includes a controller operable to adjust a switching frequency of the first transistor and the second transistor to substantially match a resonant frequency of the capacitor and the inductor.

Particular implementations can include one or more of the following features. The power supply can further include a bridge rectifier operable to rectify an alternating current (AC) voltage and produce the input voltage. The bridge rectifier can include four diodes connected in a bridge configuration. The power supply can further include a feedback circuit to generate a feedback dimming control signal to the controller for controlling the output voltage of the converter. The power supply can further include a current limit circuit to limit current in the converter in an event that the power supply experiences a short circuit. The feedback circuit can include a non-inverting amplifier to amplify a voltage associated with the current limit circuit and generate the feedback dimming control signal based on the amplifier voltage. The controller can include a detector operable to detect a peak voltage associated with the feedback dimming control voltage signal, an operational amplifier to compare the detected peak voltage with a reference voltage and generate an error signal, and a frequency control circuit operable to adjust the switching frequency of the switching circuit using the error signal. The controller can turn off the first transistor and the second transistor if the detected peak voltage is greater than a pre-determined level.

In general, in another aspect, the specification describes a method that includes: rectifying an alternating current (AC) voltage and generating an input voltage; alternately switching the input voltage to a converter at a switching frequency; converting the input voltage into an output voltage using the converter; adjusting the switching frequency to substantially match a resonant frequency of the converter; generating a feedback dimming control signal for reducing the output voltage; and sending a first error signal to a controller in an event that a pre-determined current limit for the power supply is exceeded, and shutting down the converter responsive to the error signal.

Particular implementations can include one or more of the following features. Adjusting the switching frequency to substantially match a resonant frequency of the converter can include adjusting the switching frequency to substantially realize zero-voltage switching and zero-current switching. The method can further include detecting a peak voltage associated with the feedback dimming control signal, comparing the detected peak voltage with a reference voltage and generating a second error signal, and adjusting the switching frequency using the second error signal. Reducing the output voltage can include reducing the output voltage by adjusting the switching frequency.

In general, in another aspect, the specification describes a method that includes alternately switching an input voltage to a converter using a first transistor and a second transistor, in which the converter includes a capacitor and an inductor. The method further includes converting the input voltage into an output voltage using the converter, and adjusting a switching frequency of the first transistor and the second transistor to substantially match a resonant frequency of the capacitor and the inductor.

Particular implementations can include one or more of the following features. The method can further include rectifying an alternating current (AC) voltage to produce the input voltage, generating a feedback dimming control for controlling the output voltage of the converter, and/or limiting current in the converter using a current limit circuit in an event that the power supply experiences a short circuit. The method can further include amplifying a voltage associated with the current limit circuit and generating the feedback dimming control signal based on the amplifier voltage. The method can further include detecting a peak voltage associated with the feedback dimming control voltage signal, comparing the detected peak voltage with a reference voltage and generating an error signal, and adjusting the switching frequency of the first transistor and the second transistor using the error signal.

In general, in another aspect, the specification describes a power supply that includes means for rectifying an alternating current (AC) voltage and generating an input voltage; means for alternately switching the input voltage to a converter at a switching frequency; means for converting the input voltage into an output voltage; means for adjusting the switching frequency substantially match a resonant frequency of a converter; means for generating a feedback dimming control signal for reducing the output voltage; and means for sending a first error signal to a controller in an event that a pre-determined current limit for the power supply is exceeded, and means for shutting down the converter responsive to the error signal.

Particular implementations can include one or more of the following features. The means for adjusting the switching frequency to substantially match a resonant frequency of the converter can include means for adjusting the switching frequency to substantially realize zero-voltage switching and zero-current switching. The power supply can further include means for detecting a peak voltage associated with the feedback dimming control signal, means for comparing the detected peak voltage with a reference voltage and generating a second error signal, and means for adjusting the switching frequency using the second error signal.

In general, in another aspect, the specification describes a power supply that includes means for alternately switching an input voltage to a converter using a first transistor and a second transistor, the converter including a capacitor and an inductor, means for converting the input voltage into an output voltage using the converter, and means for adjusting a switching frequency of the first transistor and the second transistor to substantially match a resonant frequency of the capacitor and the inductor.

Particular implementations can include one or more of the following features. The power supply can further include means for rectifying an alternating current (AC) voltage to produce the input voltage, means for generating a feedback dimming control for controlling the output voltage of the converter, and/or means for limiting current in the converter in an event that the power supply experiences a short circuit. The power supply can further include means for amplifying a voltage associated with the current limit circuit and generating the feedback dimming control signal based on the amplifier voltage. The power supply can further include means for detecting a peak voltage associated with the feedback dimming control voltage signal, means for comparing the detected peak voltage with a reference voltage and generating an error signal, and means for adjusting the switching frequency of the first transistor and the second transistor using the error signal.

Implementations can include one or more of the following advantages. A power supply is provided that includes one or more switching transistors that are switched—i.e., turned on or off—at substantially zero-voltage and zero-current to reduce switching loss. The power supply can include a dimming circuit that does not require any external circuitry, therefore, reducing cost of the power supply. Dimming control can be realized by adjusting a switching frequency of one or more switching transistors. Such a dimming control has no associated high peak currents unlike a conventional phase cut dimmer circuit, and therefore stress on the switching transistors is reduced.

The details of one or more implementations are set forth in the accompanying drawings and the description below. Other features and advantages will be apparent from the description and drawings, and from the claims.

DESCRIPTION OF DRAWINGS

FIG. 1 is a schematic diagram of a conventional forward converter including a synchronous rectifier.

FIG. 2 is timing diagram of a voltage Vs of the forward converter of FIG. 1.

FIG. 3 is a block diagram of a power supply.

FIG. 4 is a method for operating the power supply of FIG. 3.

FIG. 5 is a schematic diagram of the power supply of FIG. 3.

FIG. 6 illustrates a sinusoidal AC input voltage to the power supply of FIG. 3.

FIG. 7 illustrates a rectified AC input voltage.

FIG. 8 illustrates an input voltage to a converter in the power supply of FIG. 3.

Like reference symbols in the various drawings indicate like elements.

DETAILED DESCRIPTION

Figure 9:
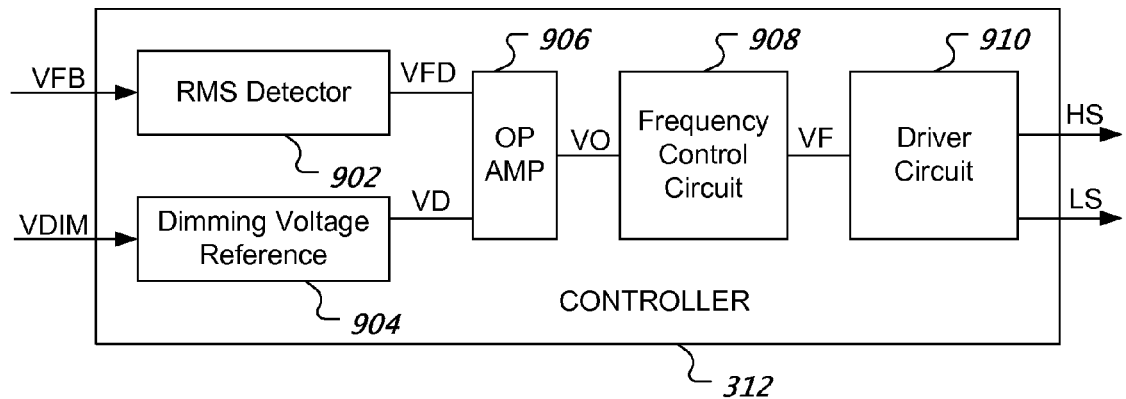
FIG. 9 is a block diagram of a controller in the power supply of FIG. 3.

FIG. 3 is a block diagram of a power supply 300 for a connected output device 302 (e.g., a halogen lamp). In one implementation, power supply 300 receives an input AC (alternating current) source voltage from a voltage source 304. Voltage source 304 can provide, for example, a 60 Hz 120 volt AC sinusoidal voltage. In one implementation, power supply 300 includes a bridge rectifier 306, a switching circuit 308, a converter 310, a controller 312, a feedback circuit 314, and a current limit circuit 318.

Bridge rectifier 306 converts the input AC source voltage from voltage source 304 into a substantially DC (direct current) voltage. In one implementation, bridge rectifier 306 is a full-wave rectifier that includes, e.g., four rectifiers in a bridge configuration.

Switching circuit 308 operates as a power switch to alternately link converter 310 to the substantially DC voltage from bridge rectifier 306. Switching circuit 308 includes one or more switching transistors (not shown). Each switching transistor in switching circuit 308 is operable to be switched—i.e., turned on or off—to realize zero-voltage switching (ZVS) and zero-current switching (ZCS). That is, each switching transistor, in one implementation, is controlled (by controller 312) to switch when a $V_{DS}$ (drain-to-source voltage) and $I_{DS}$ (drain-to-source current) of each respective switching transistor is substantially equal to zero.

Converter 310 converts the substantially DC voltage received from bridge rectifier 306 into a substantially DC output voltage having a predetermined rms (root mean square) value suitable to support output device 302. In one implementation, converter 310 converts the substantially DC voltage received from bridge rectifier 306 into a DC voltage having an rms value of substantially (12) volts. In one implementation, converter 310 is an isolated series resonant converter including one or more capacitors, inductors and transformers. Such an implementation is discussed in greater detail below in association with FIG. 5. The one or more capacitors and inductors can have pre-determined capacitance values and inductance values, respectively, such that the substantially DC output voltage output from the isolated series resonant converter has a tight load regulation. Converter 312 can be of the form of a buck converter, a buck-boost converter, or a boost converter.

Controller 312 is operable to control an output voltage level of converter 310. In one implementation, controller 312 is a frequency controller. In such an implementation, the frequency controller is operable to adjust a switching frequency of switching transistors associated with switching circuit 308 and/or converter 310 so that converter 310 outputs a substantially DC output voltage having a pre-determined rms voltage value. In one implementation, the frequency controller is also operable to adjust a switching frequency of each switching transistor associated with switching circuit 308 and/or converter 310 so that each switching transistor switches to substantially realize ZVS and ZCS. A soft start function for output device 102 can be implemented by varying a switching frequency of each switching transistor from high to low.

In an implementation in which converter 310 is an isolated series resonant converter, controller 312 adjusts a switching frequency of switching transistors associated with switching circuit 308 so that a switching frequency of each switching transistor matches a resonant frequency associated with the isolated series resonant converter, as discussed in greater detail below.

Feedback circuit 314 is operable to provide a feedback dimming control voltage 315 to controller 312 for dimming (or reducing) voltage to output device 302 (e.g., a halogen lamp). In one implementation, controller 312 adjusts a switching frequency of switching transistors associated with switching circuit 308 and/or converter 310 responsive to the feedback dimming control voltage 315 from feedback circuit 314. In one implementation, feedback circuit 314 includes a non-inverting amplifier operable to generate the feedback dimming control voltage 315 (discussed in greater detail below). A decrease in the switching frequency of switching transistors associated with switching circuit 308 and/or converter 310 will cause an increase in an output voltage level of converter 310. Similarly, an increase in the switching frequency will cause a decrease in the output voltage level of converter 310.

Power supply 300 can include a current limit circuit 318. Current limit circuit 318 is operable to limit current in converter 310 in an event that power supply 300 experiences a short circuit. In one implementation, current limit circuit 318 sends an error signal 319 to controller 312, and in response, controller 312 shuts down converter 310.

FIG. 4 shows a process 400 for generating an output voltage in a power supply (e.g., power supply 300). An alternating current (AC) input voltage is received by the power supply (step 402). The AC input voltage is rectified producing a substantially direct current (DC) voltage (e.g., using bridge rectifier 306) (step 404). The substantially direct current (DC) voltage is alternately switched (e.g., through switching circuit 308) to a converter (e.g., converter 310 using one or more switching transistors) at a switching frequency (step 406). The switching frequency (e.g., of at least one switching transistor) is adjusted to substantially realize zero-voltage switching (ZVS) and zero-current switching (ZCS) (e.g., using controller 312) (step 408). In one implementation, the switching frequency of all switching transistors is adjusted so that all switching transistors switch to substantially realize ZVS and ZCS. The substantially DC voltage is converted into an output voltage having a pre-determined voltage level (e.g., using converter 310) (step 410). The output voltage can be used to power any number of output devices, including halogen lamps and other electrical devices.

FIG. 5 illustrates one implementation of bridge rectifier 306, switching circuit 308, converter 310, and current limit circuit 318, including coupling as shown. Bridge rectifier 306 includes four diodes D1-D4. Switching circuit 308 includes switching transistors Q1-Q2. Converter 310 includes inductor L1, capacitor C2, and transformer T1. Current limit circuit 318 includes resistor CS.

More specifically, the cathode of diode D1 is in communication with the cathode of diode D2. The anode of diode D1 is in communication with a positive node of a voltage source 304 and the cathode of diode D3. The anode of diode D2 in communication with a negative node of voltage source 304 and the cathode of diode D4. The anode of diode D3 is in communication with the anode of diode D4. A drain of transistor Q1 is on communication with the cathode of diodes D1-D2. A source of transistor Q1 is in communication with a node A, which represents an input to converter 310. A drain of transistor Q2 is in communication with node A. A source of transistor Q2 is in communication with a first node of resistor CS. A second node of resistor CS is in communication with the anode of diodes D3-D4. A first node of inductor L1 is in communication with node A, and a second node of inductor L1 is in communication with a first node of inductor L2 (of transformer T1). A second node of inductor L2 is in communication with a first node of capacitor C2. A second node of capacitor C2 is in communication with the source of transistor Q2. Inductor L3 is in communication with output device 102. Inductors L2-L3 form a transformer T1. More specifically, inductor L2 forms primary winding of transformer T1, and inductor L3 forms a secondary winding of transformer T1.

In operation, voltage source 304 provides a sinusoidal AC voltage to power supply 300. In one implementation, voltage source 304 provides a sinusoidal AC voltage 600 having an rms value of substantially 120 volts, 60 Hz, as illustrated in FIG. 6. Voltage source 304 can provide sinusoidal voltages having rms values other than 120 volts. Bridge rectifier 308 receives the sinusoidal AC voltage and rectifies the sinusoidal voltage producing a substantially DC voltage $V_B$ (e.g., DC voltage 700 shown in FIG. 7). DC voltage 700 has a value of substantially 120 volts, 120 Hz. Capacitor C1 is a capacitor filter operable to reduce ripple in the substantially DC voltage. A first node of capacitor C1 is in communication with the cathode of diodes D1-D2, and a second node of capacitor C1 is in communication with the anode of diodes D3-D4.

Switching circuit 308 alternately switches an input of converter 310—i.e., node A—to the substantially DC voltage $V_B$ and ground, as illustrated by a square waveform 800 in FIG. 8, which shows the voltage on node A as switching transistors Q1-Q2 are respectively switched. In one implementation, a switching frequency of switching transistors Q1, Q2 is substantially greater than 60 Hz. In this implementation, voltage VB can therefore be considered to be constant to tens of switching periods. Thus, the voltage at node A behaves like a square wave having a peak value of VB, as shown in FIG. 8. When switching transistor Q1 turns on, switching transistor Q2 turns off, and node A is in communication with the substantially DC voltage $V_B$ through a small on-resistance of switching transistor Q1 (Q1 RDSON). During this time, the input of converter 310 is substantially equal to the substantially DC voltage $V_B$. When switching transistor Q1 is off, switching transistor Q2 is on, and the input of converter 310 is in communication with ground through a small on-resistance of switching transistor Q2 and resistor CS. During this time, the input of converter 310 is substantially equal to zero.

Switching circuit 308 alternately switches the input of converter 310 (i.e., node A) to the substantially DC voltage and ground using controller 312 (FIG. 3). FIG. 9 shows, in one implementation, controller 312. Controller 312 includes an rms detector 902, a dimming voltage reference 904, an operational amplifier 906, a frequency control circuit 908, and a driver circuit 910. Controller 312 generates a high-side control voltage HS and a low-side control voltage LS to respectively turn on and off switching transistors Q1, Q2 of switching circuit 308 shown in FIG. 3. Control voltage HS is in communication with a gate of switching transistor Q1, and control voltage LS is in communication with a gate of switching transistor Q2.

Referring again to FIG. 5, current limit circuit 318 is operable to limit current to converter 310 in an event that power supply 300 experiences a short circuit or an output device having an incorrect voltage and/or current rating is connected to power supply 300. In one implementation, current limit circuit 318 includes resistor CS.

Referring to FIGS. 5 and 9, current limit circuit 318 operates in conjunction with controller 312 as follows. When a high current, e.g., above a pre-determined threshold, passes through resistor CS, a voltage VCS on the first node of current sense resistor CS will increase. Non-inverting amplifier 316 (associated with feedback circuit 314) amplifies voltage VCS and generates an amplified feedback signal VFB. RMS detector 902 of controller 312 receives feedback signal VFB and, in one implementation, detects a peak voltage VFD associated with feedback signal VFB. Operational amplifier 906 compares peak voltage VFD with a reference voltage VD provided by dimming voltage reference 904. In one implementation, dimming voltage reference 904 is operable to adjust reference voltage VD (provided to operational amplifier 906) responsive to a dimming control signal VDIM. Dimming control signal VDIM can be set by, e.g., a user of output device 102 to control a desired dimming of output device 102 (e.g., a halogen lamp). If peak voltage VFD is greater than a maximum pre-determined voltage for voltage VD, then driver circuit 910 will shut off, and switching transistors Q1-Q2 will turn off to protect converter 310.

Referring to FIG. 5, feedback circuit 314 is generally operable to provide a feedback signal (i.e., feedback signal VFB) to controller 312 to maintain an output voltage of converter 310 at a pre-determined constant rms value, under normal operating conditions (e.g., when output device 102 operates at an rms value of 12 volts) and under dimming conditions (e.g., when output device 102 operates at an rms value lower than 12 volts).

Feedback signal VFB is generated from voltage VCS. The calculation of voltage VCS will now be described by way of example, in which a turn ratio of transformer T1 is 74:17 and current sense resistor CS is 1 ohm. In such a case, the rms value of the primary current through transformer T1 will be as follows, $$\text{rms primary current} = (17/74)*\text{rms secondary current} \quad \text{(eq. 1)}$$

where rms primary current represents an rms value of the current through the primary of transformer T1 and rms secondary current represents an rms value of the current through the secondary of transformer T1.

The rms value of current flowing through current sense resistor CS is therefore given by the following equation, $$\text{ICS(rms)} = (\frac{1}{2})*(\text{rms primary current}) \quad \text{(eq. 2)}$$

where ICS represents the rms value of current flowing through current sense resistor CS. ICS is equivalent to one-half of the primary current through the primary of transformer T1 because positive current flows through current sense resistor CS while negative current flows through L1 and C2 (of the primary of transformer T1).

Based on equations 1 and 2 above, voltage VCS can, therefore, be derived as follows:

$$VCS(\text{rms}) = RCS * ICS \qquad (\text{eq. 3})$$
$$= (1 \text{ ohm}) * (1/2) * (\text{rms primary current})$$
$$VCS(\text{rms}) = (1/2) * (17/74) * (\text{rms secondary current})$$

Figure 10:
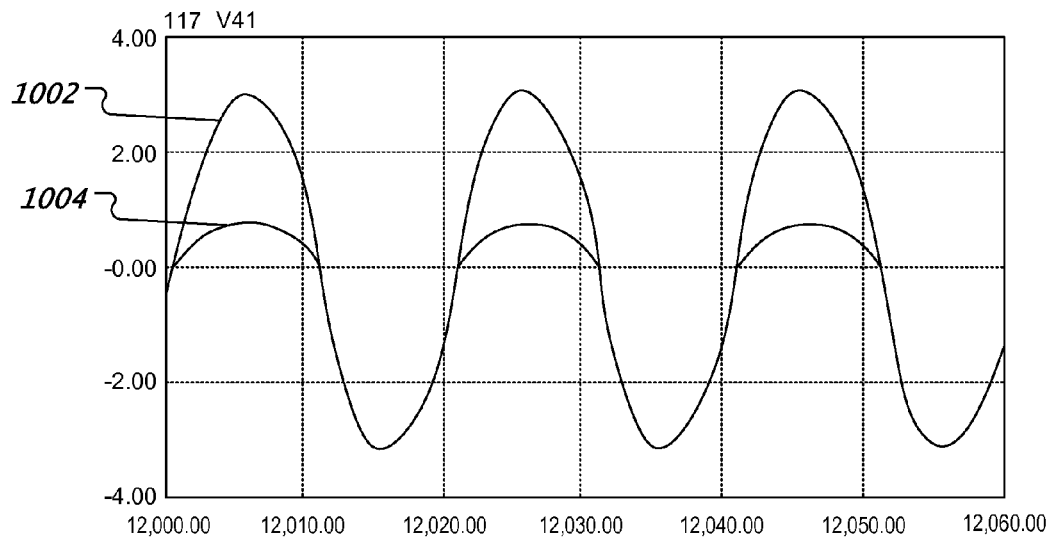
FIG. 10 illustrates current flowing through a secondary of a transformer and voltage across a current sense resistor in the power supply of FIG. 5.

FIG. 10 shows a graph 1000 that illustrates waveforms 1002, 1004 that represent waveforms of the secondary current and voltage VCS, respectively.

Referring again to FIGS. 5 and 9, non-inverting amplifier 316 amplifies voltage VCS to generate feedback signal VFB. As discussed above, RMS detector 902 in controller 312 detects a peak voltage VFD associated with feedback signal VFB and sends the detected peak voltage to operational amplifier 906. Operational amplifier 906 compares the detected peak voltage VFD with a reference voltage VD from dimming voltage reference 904 and generates a error signal VO that is received by frequency control circuit 908.

In one implementation, under normal operating conditions, dimming voltage reference 904 can be set to a value corresponding to an output voltage rating (e.g., 12 volts) of output device 102. Likewise, under dimming conditions, dimming voltage reference 904 can be set to correspond to a dimming output voltage (e.g., 11 volts, 10 volts, 2.5 volts, and so on). In one implementation, if the detected peak voltage VFD is less than reference voltage VD, then frequency control circuit 908 reduces a switching frequency of high-side control voltage HS and low-side control voltage LS to increase an output voltage of converter 310. If the detected peak voltage VFD is greater than reference voltage VD, then frequency control circuit 908 increases a switching frequency of high side control voltage HS and low side control voltage LS to reduce an output voltage of converter 310. Frequency control circuit 908 is operable to control the switching frequency of both high-side control voltage HS and low-side control voltage LS through a control signal VF sent to driver circuit 910.

Figure 11:
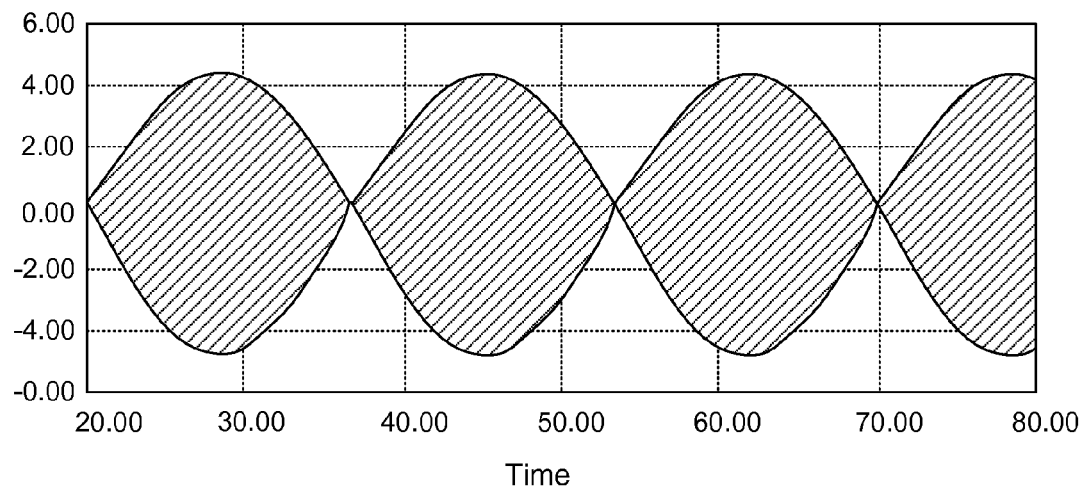
FIG. 11 shows an output voltage of a converter in the power supply of FIG. 5 during deep dimming.

FIG. 11 shows a simulation of an output voltage of converter 310 during deep dimming—i.e., when converter 310 outputs a low voltage (e.g., 2 volts) to output device 102. In the simulation shown in FIG. 11, a switching frequency of switching transistors Q1, Q2 is substantially 130 kHz, and a resistance of output device 102 is substantially 3.44 ohms. The output voltage has an rms value of substantially 2 volts. A low electromagnetic interference (EMI) is associated with the output voltage due to the sinusoidal nature of the output voltage.

Figure 12:
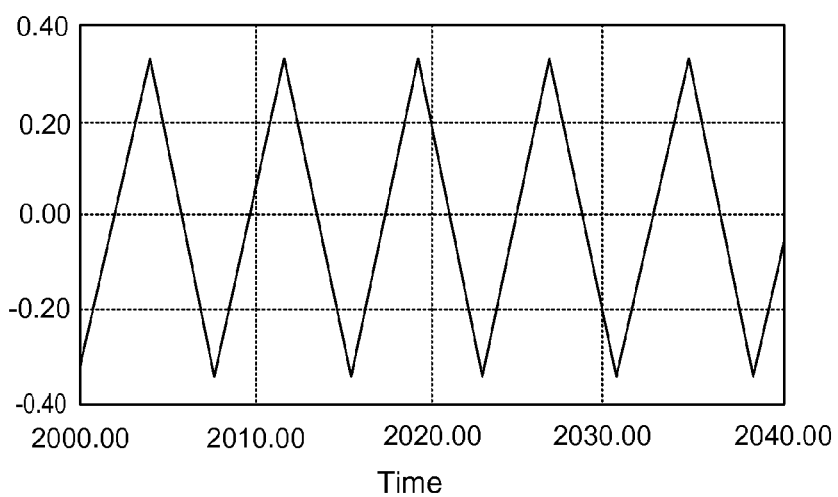
FIG. 12 shows a primary current of a transformer in the power supply of FIG. 5 during deep dimming.

FIG. 12 shows a simulation of a primary current associated with the primary of transformer T1 during a period of deep dimming. In the simulation of FIG. 12, a switching frequency of switching transistors Q1, Q2 is substantially 130 kHz, a resistance of output device 102 is substantially 3.44 ohms, and an output voltage of converter 310 is substantially 2 volts. As shown in FIG. 12, a peak current of the primary of transformer T1 is substantially 0.3 A. Unlike a conventional dimming circuit, the peak primary current reduces as the output voltage (of converter 310) is reduced, thus there are no associated high peak currents.

Referring to FIG. 5, in one implementation, converter 310 is an isolated series resonant converter that includes inductor L1, capacitor C2, and transformer T1. In one implementation, operating values for inductor L1, capacitor C2, and transformer T1 can be selected to permit switching transistors Q1-Q2 to switch to substantially realize ZVS and ZCS. The operating values can also be selected to permit power supply 300 to have a tight load regulation. For example, in one implementation, inductor L1 has an inductance value of 470 µH, capacitor c2 has a capacitance value of 22 nF, and transformer T1 has a resonant inductance Lm of 14.3 mH.

The switching of switching transistors Q1-Q2 to substantially realize ZVS and ZCS (in one implementation) will now be described. As shown in FIG. 8, square waveform 800 appears on node A, which represents an input to converter 310. A voltage VA on node A can be decomposed into a series of basic frequency components through a Fourier transform as follows:

$$V_A = \qquad (\text{eq. 4})$$
$$\frac{Vin}{2} + 4 * \frac{Vin}{\Pi}(\sin(\omega * t)) + \frac{1}{3}(\sin(3 * w * t)) + \frac{1}{5}(\sin(5 * w * t)) + \dots$$

where $\omega = 2*\Pi*FS$, and FS represents a switching frequency of switching transistors Q1-Q2.

The first component of voltage VA—i.e., (Vin/2)—represents a DC component of voltage VA. This DC component of voltage VA is blocked by capacitor C2, and is not transferred to the secondary of transformer T1. The third (and higher) terms of voltage VA represent high frequency harmonic components of voltage VA. These high frequency harmonic components are filtered by a filter formed by inductor L1 and capacitor C2, and also are not transferred to the secondary of transformer T1. Only the second term of voltage VA—i.e., 4*(Vin/Π)*sin(ω*t)—is transferred to the secondary, at a switching frequency FS.

Figure 13:
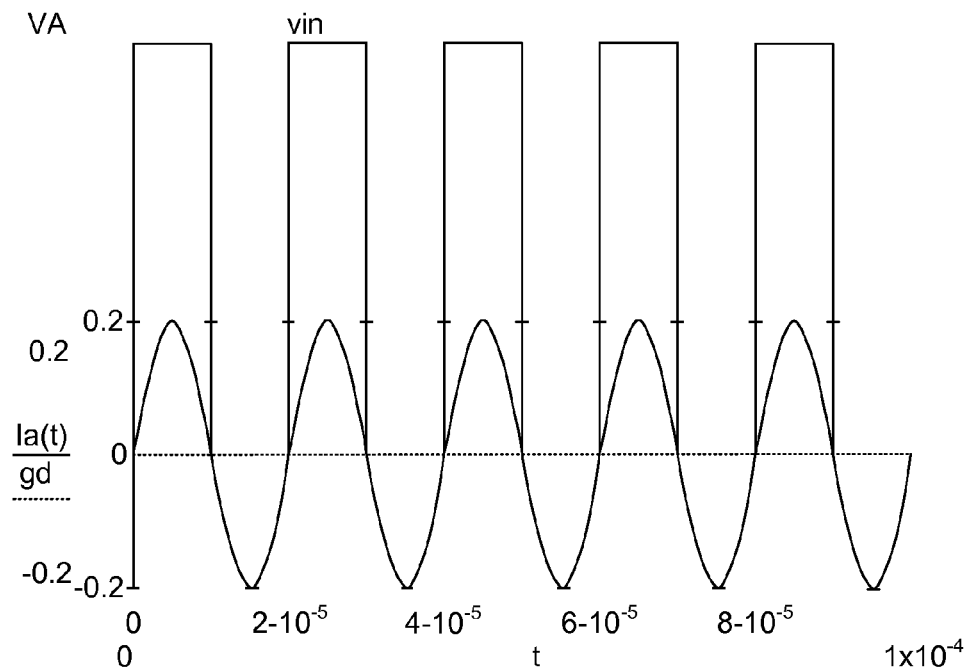
FIG. 13 illustrates current through an inductor and an input voltage to a converter in the power supply of FIG. 5.

When the switching frequency FS (of switching transistors Q1-Q2) substantially matches a resonant frequency FR of converter 310, inductor L1 and capacitor C2 behave substantially as a resistor—i.e., a characteristic impedance associated with inductor L1 and capacitor C2 has no associated imaginary parts. As shown in FIG. 13, current IA through inductor L1 tracks the second term of voltage VA.

Figure 14A:
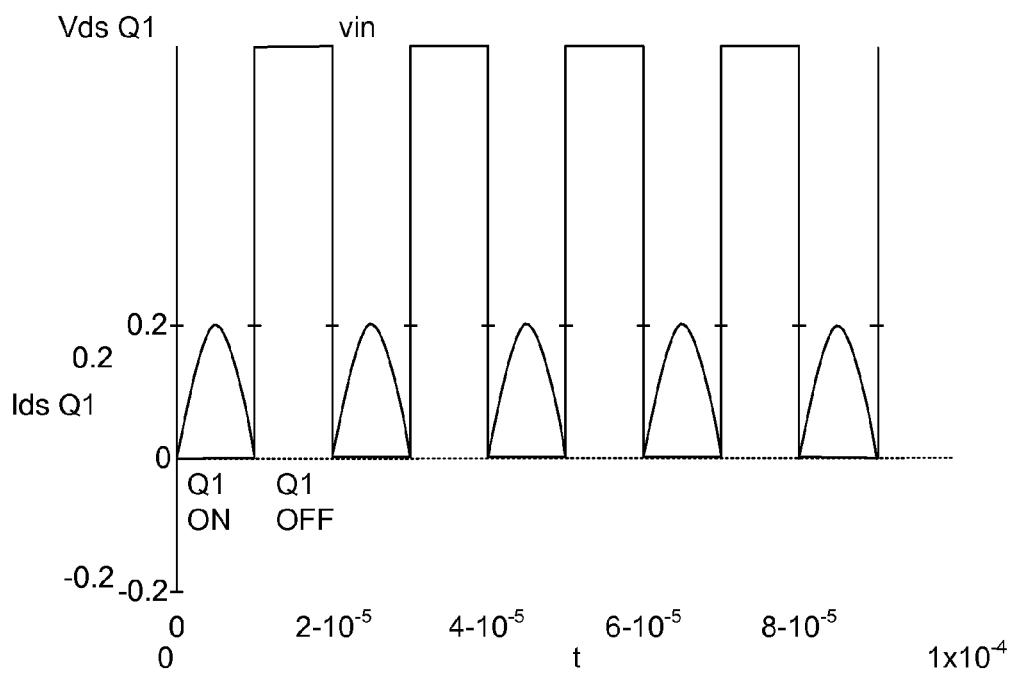
FIGS. 14A-14B are graphs of the current and voltage across switching transistors in the power supply of FIG. 5.
Figure 14B:
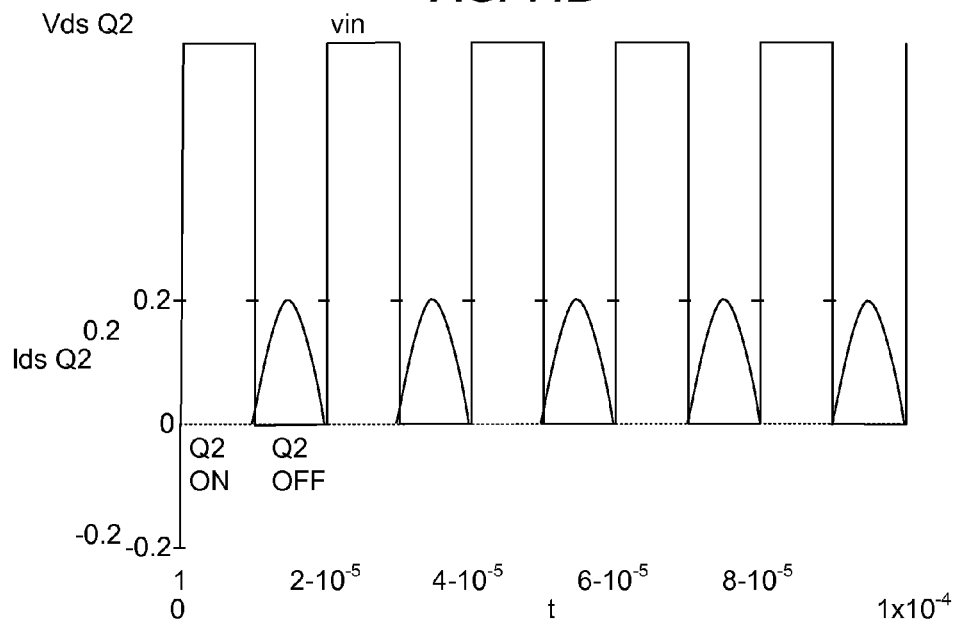

FIGS. 14A-14B illustrate voltages across switching transistors Q1-Q2 ($V_{DS}$ Q1, $V_{DS}$ Q2) and current flowing through switching transistors Q1-Q2 ($I_{DS}$ Q1, $I_{DS}$ Q2) as switching transistors Q1-Q2 are turned on and off (when a switching frequency FS of switching transistors Q1-Q2 substantially matches a resonant frequency F0 of converter 310). As shown in FIG. 14A, at the switching transition points of transistor Q1, current flowing through switching transistor Q1 ($I_{DS}$ Q1) is substantially equal to (0), and a voltage across switching transistor Q1 ($V_{DS}$ Q1) is substantially equal to (0). Likewise, as shown in FIG. 14B, at the switching transition points of transistor Q2, current flowing through switching transistor Q2 ($I_{DS}$ Q2) is substantially equal to (0), and a voltage across switching transistor Q2 ($V_{DS}$ Q2) is substantially equal to (0).

Figure 15:
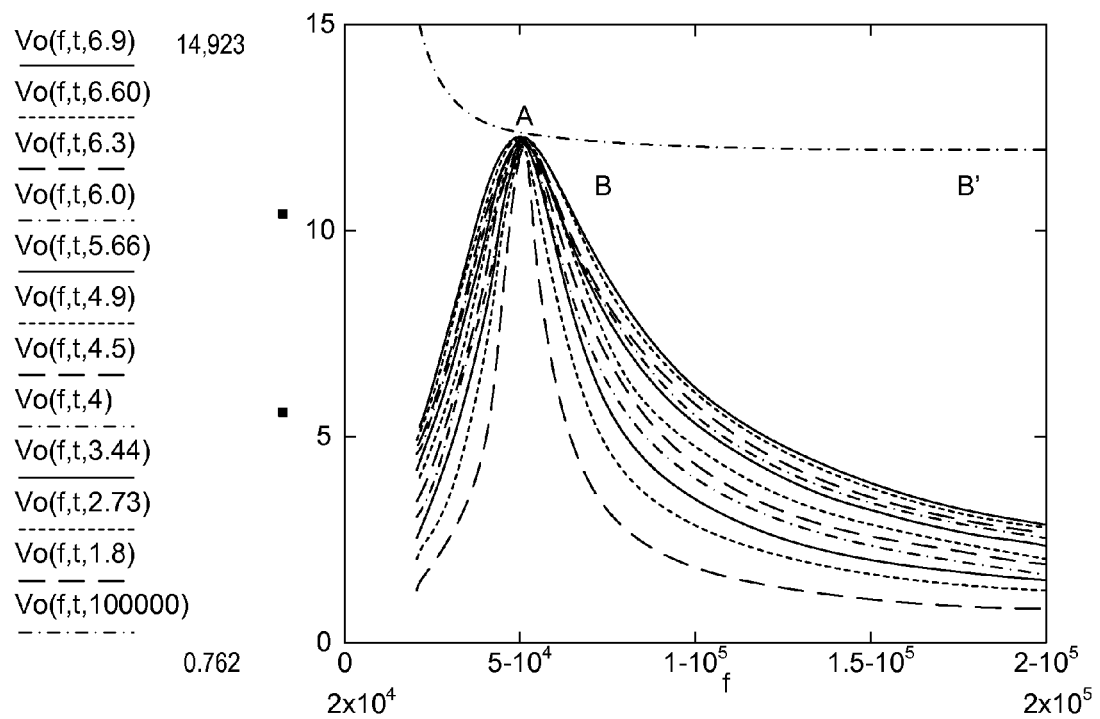
FIG. 15 is graph of the output voltage of the converter in the power supply of FIG. 5.

The resonant frequency F0 of converter 310 can be determined by plotting an output voltage waveform of equation 5 as follows:

$$Vo(f, k, r) :=$$

$$\left(\frac{60 \cdot \frac{4}{\pi\sqrt{2}}}{n}\right) \cdot \frac{w(f)^2 \cdot k \cdot L1(k) \cdot C1 \cdot R1(r)}{\sqrt{\lfloor R1(r) - w(f)^2 \cdot C1 \cdot L1(k) \cdot R1(r) \cdot (k+1) \rfloor^2 + \lfloor k \cdot w(f) \cdot L1(k) \cdot (1 - w(f)^2 \cdot L1(k) \cdot C1) \rfloor^2}}$$

where f represents a switching frequency, k represents a magnetic inductance of transformer T1, and R1 represents a resistance coupled to the primary of transformer T1. FIG. 15 illustrates a plot of the output voltage of converter 310 at different output resistance values that represent a resistance of output device 102 (i.e., from 6.9 ohms to 1.8 ohms). As shown in FIG. 15, point A represents a common operating point where a switching frequency FS (of switching transistors Q1-Q2) substantially matches a resonant frequency F0 of converter 310. In one implementation, controller 312 is operable to adjust a switching frequency of switching transistors Q1-Q2 to substantially match the resonant frequency F0 of converter 310.

Also shown in FIG. 15 is a voltage curve B-B'. Voltage curve B-B' represents an output of converter 310 during times that the secondary of transformer T1 is open—i.e., there is an open circuit within the secondary of transformer T1. The voltages represented by voltage curve B-B' do not vary greatly from the voltage at the common operating point A. Converter 310 can, therefore, have a very tight load regulation.

A number of implementations have been described. Nevertheless, it will be understood that various modifications may be made without departing from the spirit and scope of the invention. For example, the converter topologies described above—e.g., converter 310—can be implemented with a DC-DC converter. In addition, the converter topologies discussed above can be used within power supplies to supply power to devices other than halogen lamps—for example, DC power supplies for telecommunications equipment and computer equipment. Accordingly, other implementations are within the scope of the following claims.

What is claimed is:

1. A device comprising:
a controller to control a DC-DC (direct current) converter, the controller including:
a detector to receive a voltage feedback signal, and to detect a peak voltage associated with the voltage feedback signal;
a dimming voltage reference to receive a dimming control voltage, and to generate a reference voltage;
an operational amplifier to compare the peak voltage with the reference voltage; and
a frequency control circuit to generate a control signal based on the comparison to control the DC-DC converter.

2. The device of claim 1, wherein the controller is operable to control a switching frequency of one or more switching transistors associated with a switching circuit that couples a DC input voltage to the DC-DC converter so that a DC output voltage is output with a predetermined root mean square (RMS) voltage value.

3. The device of claim 2, where the controller is operable to control the switching frequency of at least one of the one or more switching transistors associated with the switching circuit to achieve zero-voltage switching and zero-current switching.

4. The device of claim 1, where the controller is operable to shut down the DC-DC converter in response to a received error signal indicating that the DC-DC converter has exceeded a predetermined current threshold.

5. The device of claim 1, further comprising a driver circuit to generate a first signal and a second signal based on the control signal and to respectively control a first transistor and a second transistor of a switching circuit that couples with the DC-DC converter to control a DC output voltage,
where the driver circuit is configured to be de-activated to turn off the DC-DC converter if the peak voltage is greater than the reference voltage.

6. The device of claim 5, where:
the switching circuit includes the first transistor and the second transistor;
the DC-DC converter includes a capacitor and an inductor; and
the controller adjusts a switching frequency of the first transistor using the first signal and the second transistor using the second signal to substantially match a resonant frequency associated with the capacitor and the inductor.

7. A system comprising:
a switching circuit to couple a DC input voltage to a converter; and
a controller to control the switching circuit such that the converter converts the DC input voltage into a DC output voltage, the controller including:
a detector to receive a voltage feedback signal, and to detect a peak voltage associated with the voltage feedback signal;
a dimming voltage reference to receive a dimming control voltage, and to generate a reference voltage;
an operational amplifier to compare the peak voltage with the reference voltage; and
a frequency control circuit to generate a first signal and a second signal based on the comparison to control the DC output voltage.

8. The system of claim 7, where the converter is an isolated series resonant converter having a predetermined resonant frequency; and
where the controller is operable to control a switching frequency of one or more switching transistors associated with the switching circuit so that the switching frequency of at least one of the one or more switching transistors matches the resonant frequency associated with the isolated series resonant converter.

9. The system of claim 7, where the controller decreases the switching frequency of at least one switching transistor to increase the DC output voltage.

10. The system of claim 7, where the controller increases the switching frequency of at least one switching transistor to decrease the DC output voltage.

11. The system of claim 7, where the controller is operable to control the switching frequency of at least one switching transistor to achieve zero-voltage switching and zero-current switching.

12. The system of claim 7, where the switching circuit includes a first transistor and a second transistor; and
where the controller generates a first control signal to control the first transistor and a second control signal to control the second transistor, the first control signal and the second control signal configured to control a voltage level of the DC output voltage.

13. The system of claim 12, where the first control signal is a first high-side control voltage, and the second control signal is a second low-side control voltage.

14. The system of claim 7, further comprising a feedback circuit operable to provide the voltage feedback signal to the controller to maintain the DC output voltage at a constant RMS value.

15. The system of claim 14, further comprising the converter, the converter including a transformer with a first winding and a second winding; and
- a current limit circuit including a current sense resistor,
- where the feedback circuit generates the feedback signal based on a voltage signal determined from at least one of a resistance of the current sense resistor, a RMS value of a current flowing through the first winding and a RMS value of a current flowing through the second winding.

16. A method comprising:
receiving a voltage feedback signal;
identifying a peak voltage associated with the voltage feedback signal;
receiving a dimming control voltage;
generating a reference voltage based on the dimming control voltage;
comparing the peak voltage with the reference voltage; and
generating a control signal to control a DC output voltage of a DC-DC converter.

17. The method of claim 16, further comprising:
receiving an alternating current (AC) voltage;
generating a DC input voltage based on the AC voltage; and
converting the DC input voltage to the DC output voltage including determining a voltage level of the DC output voltage based on the control signal.

18. The method of claim 16, where generating the control signal includes generating a first signal and a second signal to respectively control a first switching transistor and a second switching transistor associated with a switching circuit coupled to the DC-DC converter to achieve zero-voltage switching and zero-current switching.

19. The method of claim 18, further comprising:
adjusting a switching frequency of the first transistor using the first signal and the second transistor using the second signal to substantially match a resonant frequency associated with the DC-DC converter.

20. The method of claim 16, further comprising:
receiving an error signal indicating that the DC-DC converter has exceeded a predetermined current threshold; and
shutting down the DC-DC converter in response to the received error signal.

* * * * *